R. W. BRYANT & A. E. MOORE.
APPARATUS FOR RAISING SUNKEN VESSELS.
APPLICATION FILED JULY 7, 1915.
1,191,558.
Patented July 18, 1916.
5 SHEETS—SHEET 3.
Fig. 10.
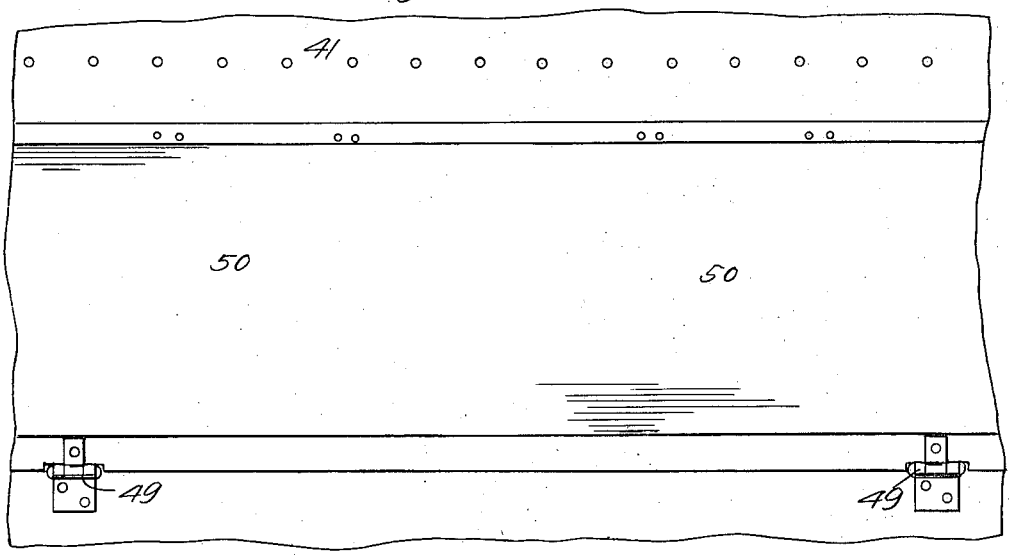
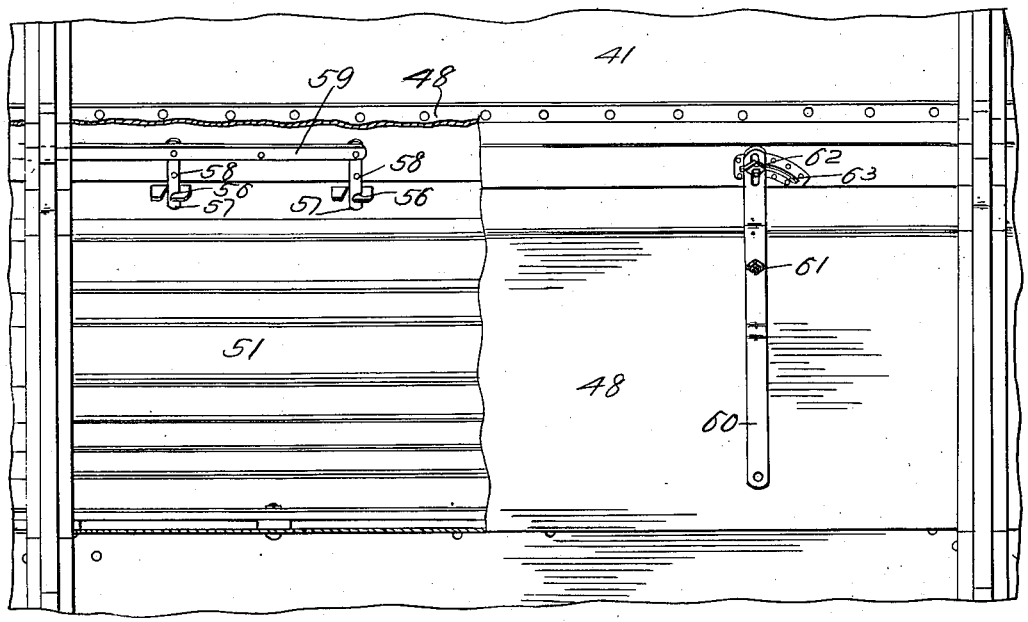
Fig. 11.
Witnesses
M. J. Pfeifer
L. E. Barkley
Inventors
Robert W. Bryant, and
Alfred E. Moore,
By
Attorney R. W. BRYANT & A. E. MOORE.
APPARATUS FOR RAISING SUNKEN VESSELS.
APPLICATION FILED JULY 7, 1915.
1,191,558. Patented July 18, 1916.
5 SHEETS—SHEET 4.
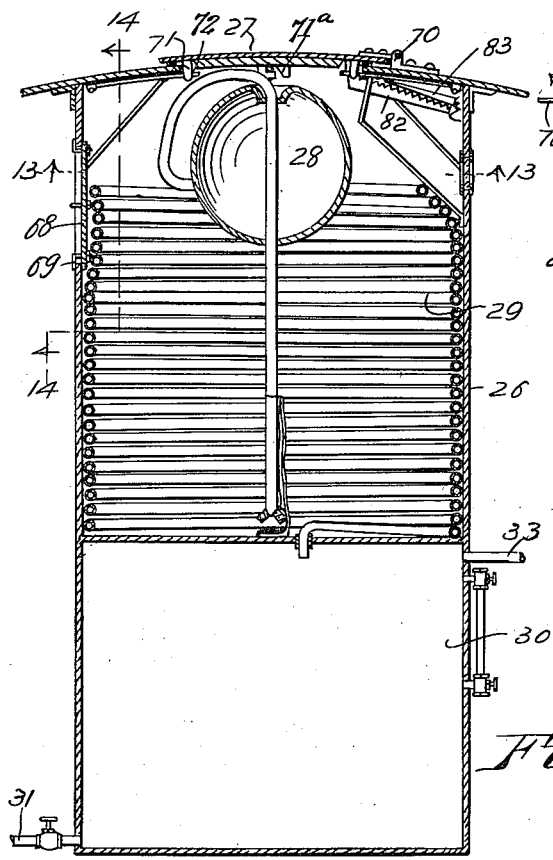
Fig. 12.
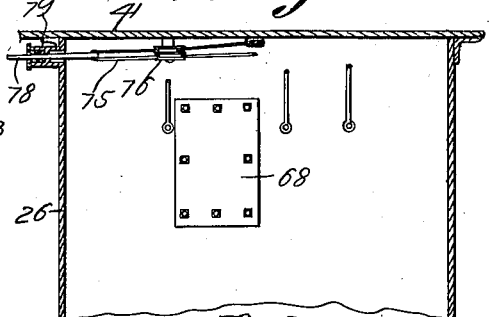
Fig. 14.
Fig. 15.
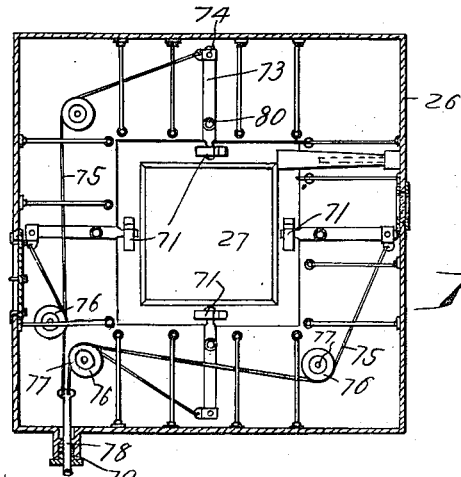
Fig. 13.
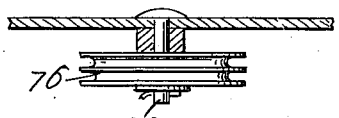
Fig. 16.

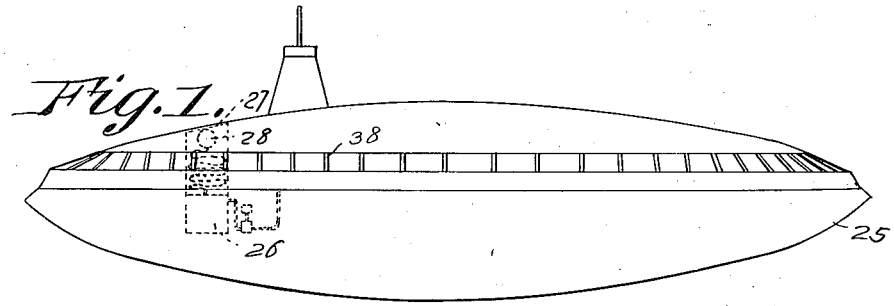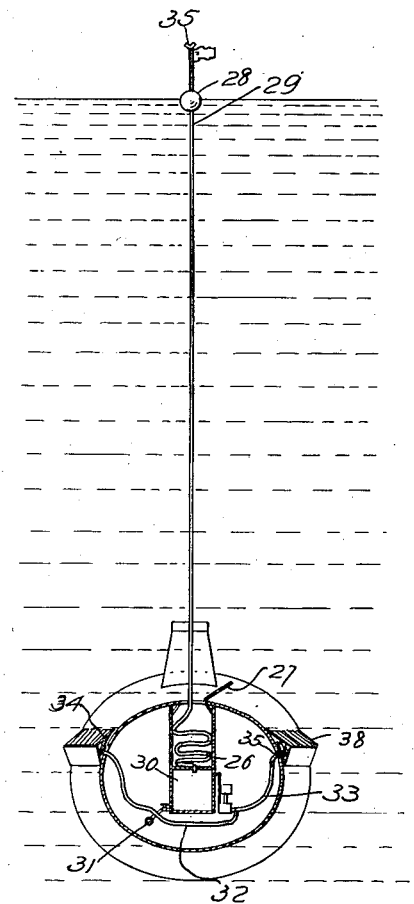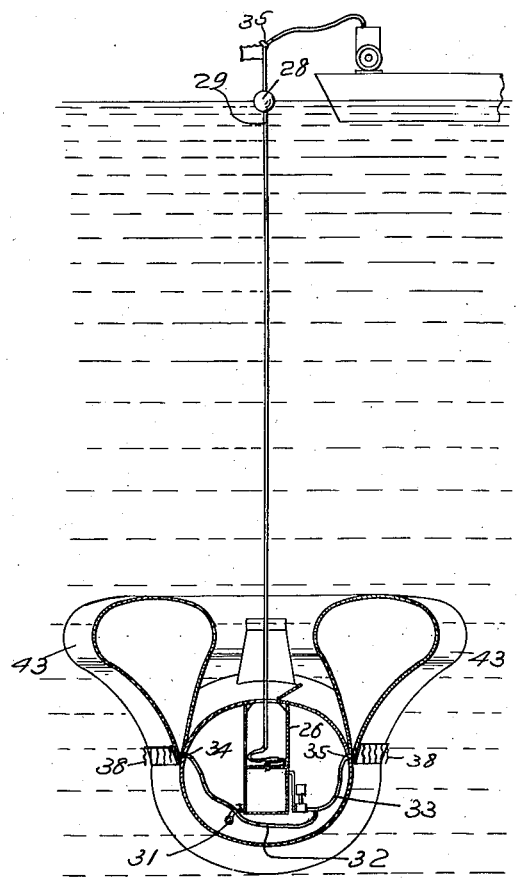

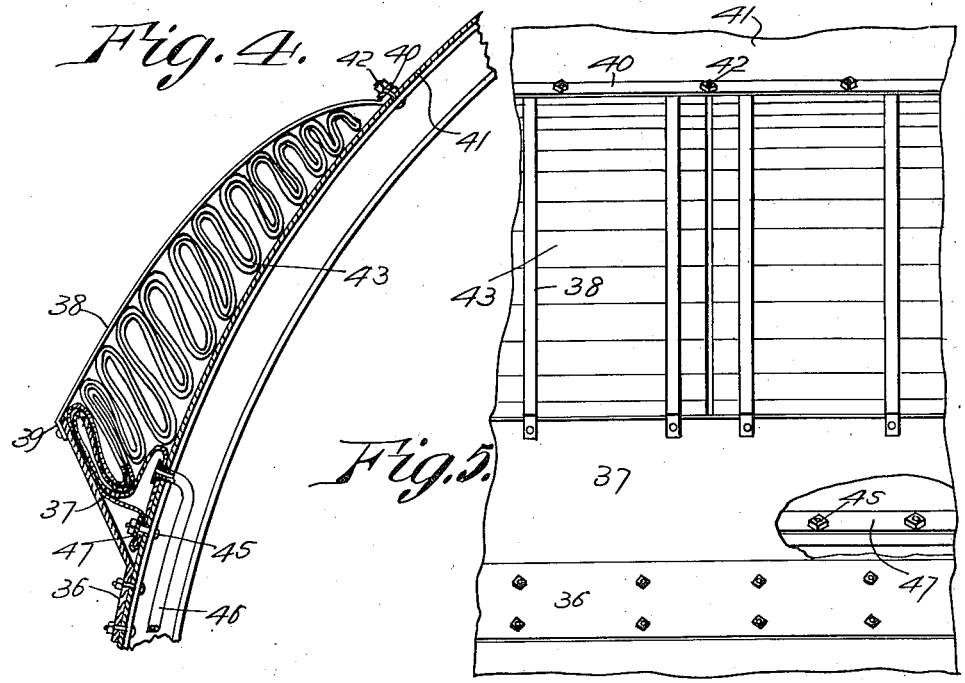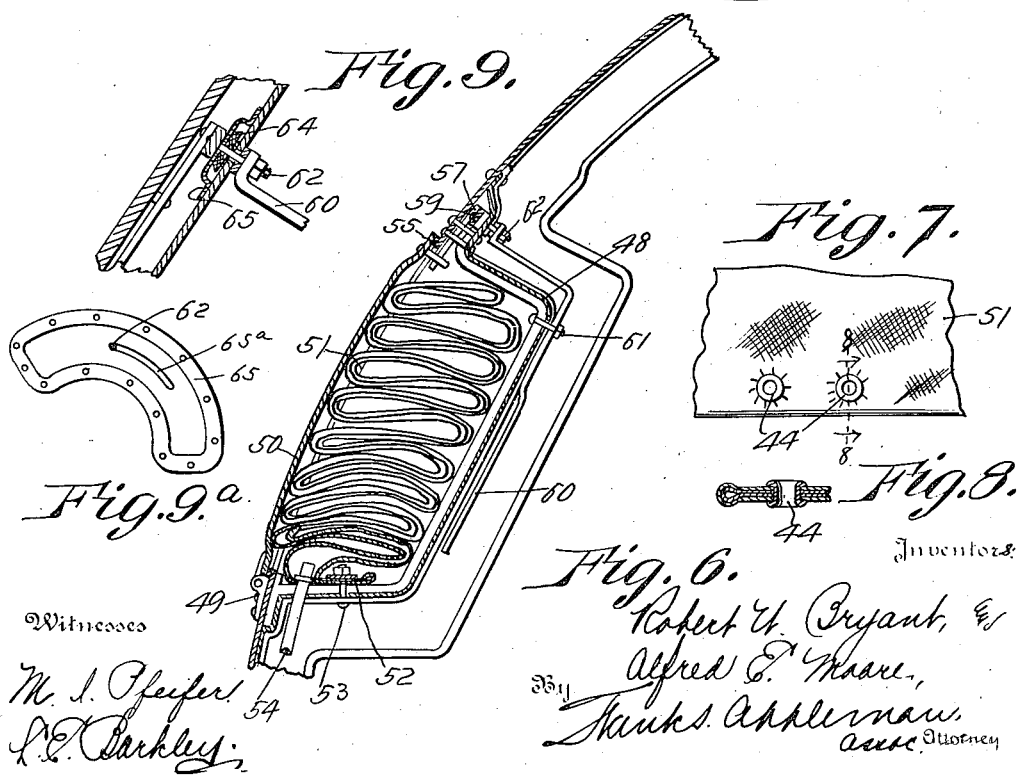

R. W. BRYANT & A. E. MOORE.
APPARATUS FOR RAISING SUNKEN VESSELS.
APPLICATION FILED JULY 7, 1915.
1,191,558.
Patented July 18, 1916.
5 SHEETS—SHEET 5.
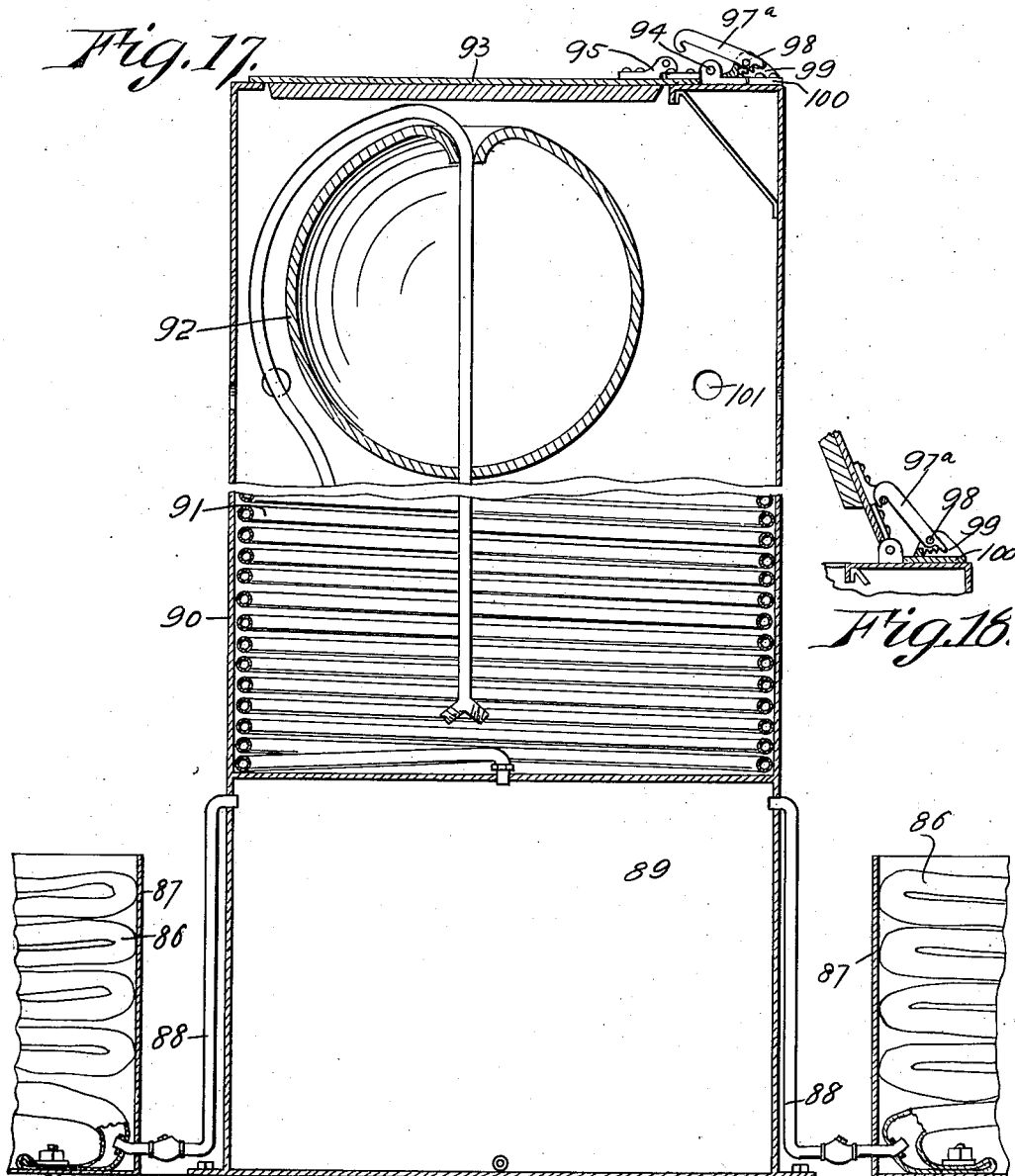
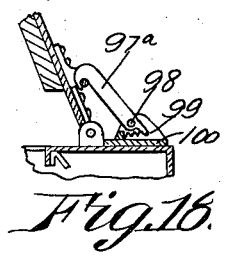
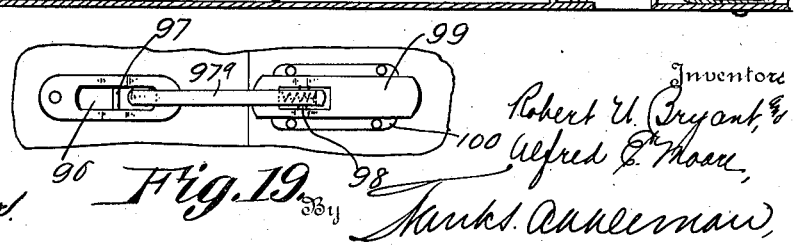

UNITED STATES PATENT OFFICE.

ROBERT W. BRYANT AND ALFRED E. MOORE, OF PUEBLO, COLORADO.

APPARATUS FOR RAISING SUNKEN VESSELS.

1,191,558.  Specification of Letters Patent.  Patented July 18, 1916.

Application filed July 7, 1915. Serial No. 38,567.

*To all whom it may concern:*

Be it known that we, ROBERT W. BRYANT, a citizen of the United States of America, and ALFRED E. MOORE, a subject of the King of Great Britain and Ireland, and residents of Pueblo, in the county of Pueblo and State of Colorado, have invented certain new and useful Improvements in Apparatus for Raising Sunken Vessels, of which the following is a specification.

This invention relates to ships and particularly to means for marking the location of submerged ships and for raising the said ships by restoring their buoyancy.

An object of the present invention is to supply a ship, whether it be a surface or submarine with inflatable casings, means being provided for so storing the casings that they will not interfere with the operation of the ship nor retard the speed of the ship; the said storage means being provided with an element for covering the casing, a further object of the invention being to provide for the removal of the protector when the casing is to be used.

A further object of this invention is to provide a buoy and a housing therefor, the said housing also being utilized for holding tubing connected to the buoy and adapted as a conduit for air to be delivered to the casings, the said housing having a door or closure with means for holding the same in an open position when the buoy has made its exit from the housing, the said provision for holding the door open being advantageous in that it prevents clamping of the hose after the buoy has left the housing.

A still further object of this invention is to provide housings for buoys and closures therefor, capable of use on a surface or submarine vessel.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation showing the application of the invention to a submarine vessel; Fig. 2 illustrates a cross sectional view of the vessel in its submerged state; Fig. 3 illustrates a similar view with the casings inflated; Fig. 4 illustrates a detail sectional view of a fragment of a hull with the casing in collapsed condition and incased; Fig. 5 illustrates a view in elevation of the same broken away to show a part of the interior; Fig. 6 illustrates a sectional view of a fragment of a hull of a submarine vessel with the casing collapsed therein and cover, and mechanical means operable from within for controlling a latch of the cover; Fig. 7 illustrates an enlarged detail view of a fragment of the casing; Fig. 8 illustrates a sectional view on the line 8—8 of Fig. 7; Fig. 9 illustrates an enlarged detail view of the latch operating mechanism shown in Fig. 6; Fig. 9$^a$ illustrates an underneath plan view of the packing plate; Fig. 10 illustrates a view in elevation of the external portion of the vessel showing the application of the covers for the casings; Fig. 11 illustrates an interior view showing the side of the vessel, the same being broken away in part to show a latch for the cover; Fig. 12 illustrates a sectional view of a buoy housing with the buoy and hose in place; Fig. 13 illustrates an underneath plan view of the cover for the housing; Fig. 14 illustrates a sectional view on the line 14—14 of Fig. 12; Fig. 15 illustrates an enlarged sectional view of a fragment of the housing showing a means for holding the door open; Fig. 16 illustrates a detail view of a pulley for engaging latch operating members; Fig. 17 illustrates a sectional view of a housing and inflatable casings showing the arrangement for use on surface vessels; Fig. 18 illustrates a sectional view of a door with a retaining hook shown in elevation; and Fig. 19 illustrates a plan view of the door retaining hook.

In these drawings 25 denotes the hull of a submarine vessel, 26 a housing, 27 a door therefor, the said housing containing a buoy 28 which will rise to the surface and indicate the location of a submerged vessel, the said buoy also carrying a hose 29 which leads to a chamber 30 formed as a part of the casing 26. The chamber 30 has a pipe 31 which may lead to a compressor within the boat, so that if the compressor is operable, air may be forced into the chamber and through the pipes 32 and 33 to the casings 34 and 35 respectively, which are suitably housed on the external surface of the hull.

In dealing with the present invention, the term "casing" shall be regarded as meaning any air bag or inflatable member connected to a boat and having for its object the increase of the buoyancy of the boat, and by the term "boat" it is to be understood that any vessel or ship is included.

As the buoy carries the hose or tube to the surface, the upper portion of said hose, which is supplied with a coupling 35, may be connected to any source of air supply and the air being forced into the chamber 30 will reach the casings through the tubes 32 and 33 and the said casings will thereby be inflated. It is the purpose of the inventors that these inflatable tubes may be of such capacity as to insure the raising of the boat when said casings are inflated.

In Figs. 4 and 6, means are illustrated for protecting the casings and in Fig. 4 the outer surface of the boat has a plate 36 with an outwardly extending flange 37, and a frangible cover 38 has a flange 39 secured to the flange 37. The frangible cover is furthermore provided with a flange 40 secured to the hull 41 by fastenings such as bolts 42. In the construction under consideration, the casing 43 is folded between the hull and the cover 38 and the said casing near one edge is provided with a series of eyelets 44 adapted to receive fastenings, such as bolts 45 by which the casing is secured to the hull. An air supply pipe 46 extends through the hull and into the casing so that air under pressure may be delivered to the casing. The frangible cover is ruptured by the pressure of the air delivered to the casing and the casing is then freed and as the air pressure increases, the boat will be raised. In addition to the bolts 45, there is a plate 47 through which the bolts extend and the said plate is clamped against the casing by such bolts, thus insuring strong connection between the said casing and the hull.

In Fig. 6, the hull is of a configuration to form a box like receptacle 48 and externally of the hull, there is a hinged butt 49 to which the cover 50 is hinged, the said cover closing the box like structure and offering a protection for the casing 51 contained therein. The casing just mentioned is of the same general structure as that described in connection with the disclosure in Fig. 4 and it is secured to the hull of the vessel by a clamping plate 52 and fastenings 53, air being supplied to the casing by the pipe 54 which extends through the hull and into the casing. The cover 50 has lugs 55 shaped to form shoulders 56 engaged by latches 57, which latches are pivoted on studs 58 and are pivotally connected to the operating bar 59, which operating bar has a thrust movement imparted to it by the lever 60 which is mounted on a pivot 61 and connected to the bar 59 by the pivot 62. A slot 63 is formed in the plate forming a part of the hull and a packing 64 surrounds the pivot 62 and is confined by the plate 65. The packing 64 is slidable in the plate 65 and is of such length as to always cover the slot 65$^a$ to prevent water from entering the slot regardless of the position of the pivot in the said slot.

That form of the invention illustrated in Figs. 12 to 16 inclusive is of utility in connection with the submarine boats as the buoy and pipe housing 26 has a mechanically retained cover 27 applied to it and all the joints of the housing are waterproof so as to prevent flooding of the housing. Furthermore, the housing has a side door 68 held in place by clips 69 the said side door being provided to permit access to the interior of the housing independently of the top door. The top door is mounted on a hinge 70 so that it may swing open and the under surface of the door is provided with lugs 71 having notches 72 to receive the outer ends of the pivoted latches 73, the outer ends of the said latches each having a clip 74 to which a flexible pulling member 75 is connected, the said pulling member being guided by the sheaves 76 on the studs 77. The lugs 71 further have beveled edges 71$^a$ which constitute cams over which the ends of the latches 73 ride as the said latches are moved on their pivots and this action results in raising the door initiatively to a degree which will permit water to flow into the housing and lift the buoy and cause it to leave the housing. The flexible members and their arrangement is well shown in Fig. 13 and it will be seen that they lead to a rod 78 to which they are connected and the said rod is slidable in a stuffing box 79 on the wall of the housing so that by sliding the rod 78, the latches 73 are oscillated on their pivots 80 and are moved out of engagement with the lugs 71 at which time the door is free to swing on its hinges and release the buoy 28 in the housing, the said buoy being attached to a flexible pipe 29. As in the structure heretofore described, the housing has a horizontally disposed partition forming a chamber 30 through which air may pass to the distributing pipes, such as 33 which distributing pipes are connected to the air bags or casings. The housing just described is of the same construction as that to which reference has been made in connection with the description of Figs. 1, 2 and 3, except that they are shown in greater detail in Figs. 12 to 16 inclusive.

In order to guard against pinching of the flexible pipe by the closing of the door, the said door is held in its open position by a prop 81 which has one end connected to the door, the said prop having serrations 82, the teeth of which engage a hinged prop engaging arm 83, which arm is pivoted to the ears 84 of a plate 85 secured in any appropriate way on the inner wall of the housing. As the door is partly elevated, the serrations of the prop 82 engage the serrations of the arm 83 and the door is thereby held in open position and it cannot fall to a closed position until the prop and arm are disengaged or are set in their nested relation, as they are shown in Fig. 12.

In Figs. 17 to 19, there is illustrated a device which is of utility in connection with the decks of vessels, that is to say, the air bags or casings 86 are folded and confined in receptacles 87, the said casings being of the construction of those heretofore described and having air supply pipes 88 leading from an air tight water trap consisting of a chamber 89, to a housing 90, the said housing being of such capacity as to contain a flexible pipe 91 and a buoy 92 to which buoy the flexible pipe is attached, so that as the buoy rises, it will carry the pipe to the surface of the water where it can be coupled to an air supplying medium for delivering air to the casings. In this embodiment of the invention, the door 93 is mounted on a hinge 94 and the said door has plates 95 with recesses 96. There are transversely disposed rods 97 in the recesses and these rods are engaged by hooks 97ª which swing on pivots 98 carried by the ears 99 of the plates 100. When the door swings upwardly into open position, therefore, the hooks 97ª engage the rods 97 and the door is held open.

The housing 90 has apertures 101 to admit water to the said housing to float the buoy so that it may escape from the said housing and rise to the surface of the water in which the boat is submerged. In this last mentioned construction, the door is unsecured as there is no necessity for a water tight compartment for containing the buoy and pipe as there is in a submerged structure which would be of utility in a submarine.

It is obvious that bags may be taken by a diver and secured by chains, ropes or cables to a sunken ship and thereafter the bags or casings may be inflated for the purpose of raising the said ship.

We claim

1. In an apparatus for raising sunken vessels, a casing for holding air, means for connecting the casing to a ship, a housing, a flexible tube and a buoy in the housing, said tube being connected to the buoy whereby when the buoy moves it carries the said tube, a door for closing the housing, means for connecting the tube to deliver air to the casing, latches for holding the door closed, means for operating the latches to release the door, a plate having a rod, said plate being carried by the door, and hooks pivotally connected to the casing and adapted to engage said rod for holding the door in open position.

2. In an apparatus for raising sunken vessels, a housing adapted to be carried by the ship, said housing having a central partition dividing the same into an air compartment and a buoy compartment, a buoy in the buoy compartment, a flexible tube connecting the buoy and air compartments, casings formed in the side of the ship, flexible air holding means in the casings, means for providing connection between the flexible air holding means and air compartment, a closure for the housing, means for holding the closure in an open position.

3. In an apparatus for raising sunken vessels, a housing carried by the ship, said housing forming a buoy casing, casings formed in the sides of the ship, flexible air holding means in each of the casings, means for connecting the buoy and flexible air holding means, a closure for said housing, latch members for holding the closure in a locked position, and means for operating the latch members simultaneously.

4. In an apparatus for raising sunken vessels, a housing adapted to be carried by the ship, casings formed in the sides of the ship, said casings adapted to support flexible air holding means, a buoy in the housing, an air hose connecting the buoy and flexible air holding means, whereby air is forced through the air hose to inflate said flexible air holding means, frangible covers for the casings formed in the side of the ship, whereby expansion of the flexible air holding means removes said frangible covers to release said flexible air holding means.

5. In an apparatus for raising sunken vessels, a housing adapted to be carried by the ship, a partition in the housing dividing the same into an air compartment and a buoy containing compartment, a buoy in the buoy containing compartment, means for connecting the buoy and air compartment, casings formed in the sides of the ship, flexible air holding means in the casings, means for connecting the flexible air holding means and air compartment, whereby fluid forced into said air compartments feeds said air holding means simultaneously.

In testimony whereof, we have hereunto affixed our signatures in the presence of two witnesses.

ROBERT W. BRYANT.
ALFRED E. MOORE.

Witnesses:
L. McLEAN,
WILL J. ORANGE.